United States Patent [19]

Hiroi et al.

[11] Patent Number: 4,714,988
[45] Date of Patent: Dec. 22, 1987

[54] FEEDFORWARD FEEDBACK CONTROL HAVING PREDICTIVE DISTURBANCE COMPENSATION

[75] Inventors: Kazuo Hiroi, Hachioji; Kojiro Ito, Machida, both of Japan

[73] Assignee: Kabushiki Kaisha Toshiba, Kanagawa, Japan

[21] Appl. No.: 698,791

[22] Filed: Feb. 6, 1985

Related U.S. Application Data

[63] Continuation-in-part of Ser. No. 477,384, Mar. 21, 1983, Pat. No. 4,563,735.

[30] Foreign Application Priority Data

| Mar. 26, 1982 | [JP] | Japan | 57-47349 |
| Mar. 26, 1982 | [JP] | Japan | 57-47350 |
| Aug. 25, 1982 | [JP] | Japan | 57-147155 |
| Feb. 7, 1984 | [JP] | Japan | 59-19335 |

[51] Int. Cl.$^4$ ............................................. G05B 13/02
[52] U.S. Cl. ..................................... 364/165; 318/632; 364/158; 364/176
[58] Field of Search ............... 364/164, 165, 166, 176, 364/158, 159, 160, 161, 162, 163; 318/561, 632

[56] References Cited

U.S. PATENT DOCUMENTS

| 3,758,762 | 9/1973 | Littman et al. | 364/165 |
| 3,767,900 | 10/1973 | Chao et al. | 364/164 |
| 3,798,430 | 3/1974 | Simon et al. | 364/164 |
| 3,939,328 | 2/1976 | Davis | 364/161 |
| 4,008,386 | 2/1977 | Ross | 364/161 |
| 4,313,165 | 1/1982 | Clelford et al. | 364/161 |
| 4,319,320 | 3/1982 | Sato et al. | 364/165 |
| 4,344,128 | 8/1982 | Frye | 364/161 |
| 4,389,618 | 6/1983 | Bauman | 364/164 |
| 4,555,757 | 11/1985 | Dorman | 364/165 |
| 4,563,735 | 1/1986 | Hiroi et al. | 364/165 |

*Primary Examiner*—Joseph Ruggiero
*Attorney, Agent, or Firm*—Schwartz, Jeffery, Schwaab, Mack, Blumenthal & Evans

[57] ABSTRACT

In a method and a system for process control comprising in combination a feed-back control in which a manipulated variable is determined in accordance with a deviation of a controlled variable with reference to a target value and a feed-forward control in which a disturbance is detected and a disturbance compensation is determined and used in determining the manipulated variable to counteract the effect of the disturbance, when the control is in a steady state, disturbance compensation is adjusted in such a manner that the difference between the disturbance compensation and the manipulated variable is reduced.

20 Claims, 42 Drawing Figures

FIG. 9a  D  
FIG. 9b  PV  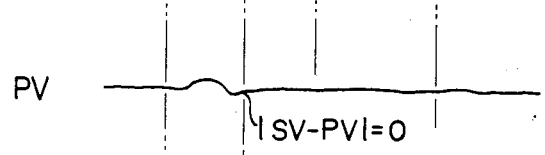
FIG. 9c  M  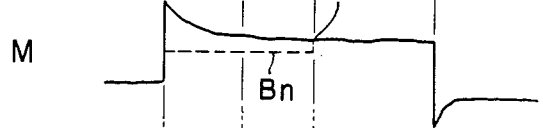
FIG. 9d  Bn  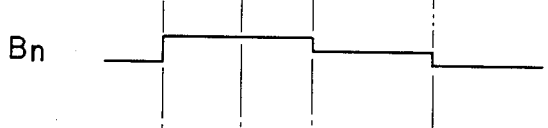
FIG. 9e  Cn  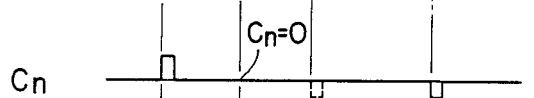
FIG. 9f  En  

FIG. 9h  $K_{n-1}$  
FIG. 9i  $K_n$  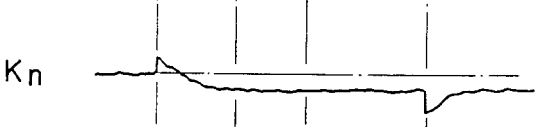
FIG. 9j  167 ON/OFF  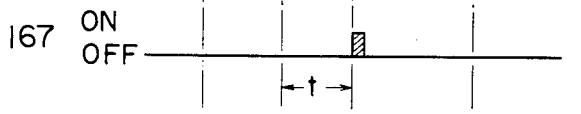

FIG. 10a  D 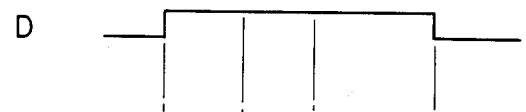
FIG. 10b  PV 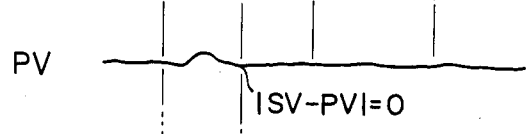
FIG. 10c  M 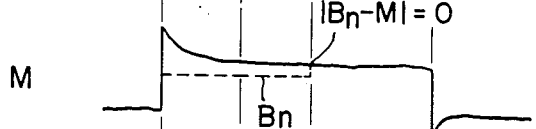
FIG. 10d  Bn 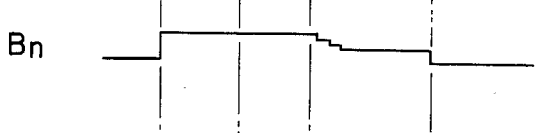
FIG. 10e  Cn 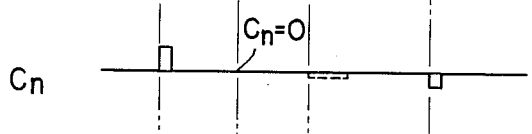
FIG. 10f  En 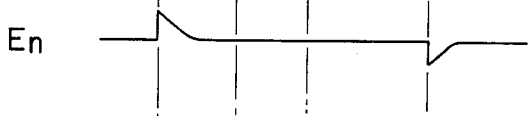

FIG. 10h  $K_{n-1}$ 
FIG. 10i  Kn 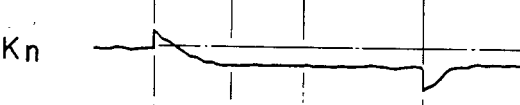
FIG. 10j  167 ON/OFF 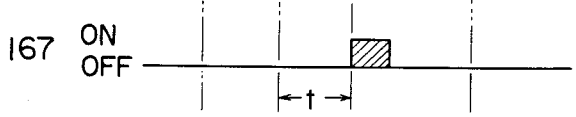

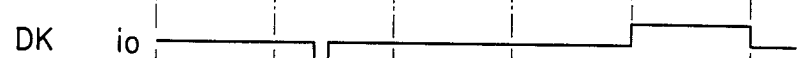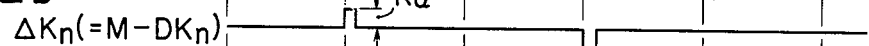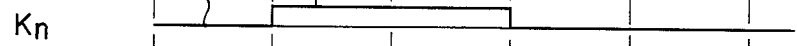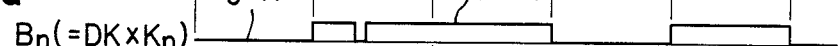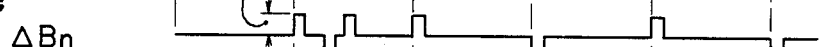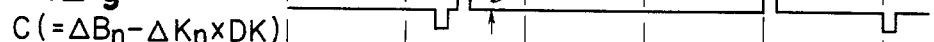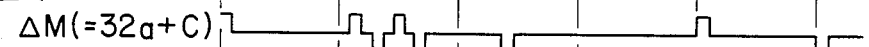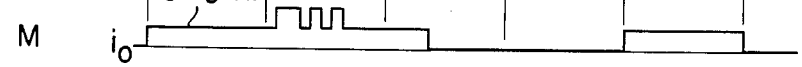

FEEDFORWARD FEEDBACK CONTROL HAVING PREDICTIVE DISTURBANCE COMPENSATION

CROSS-REFERENCE TO RELATED APPLICATION

This application is a continuation in part of our prior application Ser. No. 477,384 filed Mar. 21, 1983 entitled "PROCESS CONTROLLING METHOD AND SYSTEM".

BACKGROUND OF THE INVENTION

The present invention relates to a method and a system of process control comprising in combination a feed-back control and a feed-forward control, particularly useful in implementing a direct digital control.

In a process control system, a feed-back control system plays an important role, but the feed-back system operates responsive to the change in the controlled variable and executes a required correction only after the controlled variable deviates from a set value or target value. Therefore, there arises no problem as far as the controlled variable varies slowly, but the feed-back control system has the serious defect that its transient response is delayed when a sudden variation in disturbance occurs because the feed-back correction is made only after the controlled variable deviates from a target value. A solution to this problem is to use, in combination with the feed-back control system, a feed-forward control system in which disturbances are detected and a correction or compensation based on prediction is made before the controlled variable is actually affected.

FIG. 1 shows a fundamental control system comprising in combination a feed-back system and a feed-forward system. A comparator 1 compares a controlled variable with a target value and the result of this comparison; i.e., difference between the target value and the controlled variable is fed to a PID controller 2. The output of the PID controller 2 is fed to an adder or sum node 3. Meanwhile a disturbance D, which is transmitted through an imaginary path 7 with a transfer function $G_D$, affects the controlled variable X. In order to compensate for or counteract the adverse effects of disturbance D on the controlled variable X, the disturbance D is transmitted through a feed-forward model 8 with a transfer function $G_F$ to the adder 3 to be added to the output from the controller 2. The resulting output from the adder 3 is fed as a manipulated variable to a controlled process 10, and the effect of the manipulated variable transmits through an imaginary path 4 with a transfer function $G_P$. The effect of the disturbance through the path 7 and the effect of the manipulated variable M are effectively added to become the controlled variable X. For illustration, this summation is shown to be effected by an adder or sum node 5.

Therefore, if the output from the controller 2 is designated by Y, the controlled variable X is given by $$X = (Y + D \cdot G_F) \cdot G_P + D \cdot G_D \quad (1)$$
$$= Y \cdot G_P + D \cdot (G_D + D_F \cdot G_P)$$

From equation (1) it is readily seen that, in order that the controlled variable X may be free from any adverse effects from the disturbance, the following condition must be satisfied:

$$G_D + G_F \cdot G_P = 0$$

It follows that the transfer function $G_F$ of the feed-forward model 8 must be $$G_F = -G_D/G_P \quad (2)$$

In general, the transfer functions $G_D$ and $G_P$ may be approximated in terms of a combination of a first-order time-lag and a dead time as follows:

$$G_P = \frac{K_P}{1 + T_P \cdot S} e^{-L_P \cdot S}$$

and $$G_D = \frac{K_D}{1 + T_D \cdot S} e^{-L_D \cdot S}$$

where
$K_P$ and $K_D$ are gain constants, respectively;
$T_P$ and $T_D$ are time constants, respectively; and
$L_P$ and $L_D$ are dead times, respectively.

It follows that the transfer function $G_F$ of the feed-forward model 8 is given by $$G_F = -\frac{G_D}{G_P} = -\frac{K_D}{K_P} \cdot \frac{1 + T_P \cdot S}{1 + T_D \cdot S} \cdot e^{-(L_D - L_P) \cdot S} \quad (3)$$

If the dead time of $G_P$ and dead time of $G_D$ are substantially the same, Eq. (3) may be rewritten in the form of $$G_F = -\frac{K_D}{K_P} \cdot \frac{1 + T_P \cdot S}{1 + T_D \cdot S} \quad (4)$$

The thus simplified equation (4) is often used in practical applications. However, it sometimes occurs that the characteristic of the particular process on which the feed-forward control is effected is not correctly approximated by the first order equation (4), or the characteristic of the process is not linear. In addition, the process control system has various limitations and is subjected to various conditions. As a result, the prior art feed-forward system has encountered the following problems:

(1) It is not possible to set or adjust, independently of each other, gains of the static and dynamic compensation components of the disturbance compensation, while such independent setting is desirable to adapt the system to the process characteristics. It is noted, in this connection, that setting of the gain can involve setting different gains for different directions of changes (increase and decrease) i.e., different polarities or signs of the compensation value;

(2) It is not possible to provide a dead band or zone only for the static compensation component alone or dynamic compensation component alone. The provision of dead zone nullifies the feed-forward control while the change of the disturbance is small.
It is not possible to set the dead zones of the two components independently of each other;

(3) It is not possible to provide upper and lower limits to the static compensation component alone or to the dynamic compensation component alone. It is not possible to set the limit values of the two components independently of each other;

(4) It is difficult to achieve a "bumpless" switching when the controller 2 is switched between the automatic and manual controls (especially where a velocity type controller is in use); and (5) It is difficult to analyze and understand the qualitative significance of the feed-forward control, so that the adjustment of the controller is difficult.

Moreover, where a velocity type PID controller is used, the prior art feed-forward system has the following drawbacks.

As shown in FIG. 2, where the PID controller 2 is of a velocity type, the output of the feed-forward model 8 is converted by a position type to velocity type converter or a difference detector 9 before being applied to the adder 3. The output of the adder 3 is then converted by a velocity type to position type converter 6 and is thereafter used as the manipulated variable M of the process.

Upon relatively large stepping change in the disturbance, the manipulated variable M will change as shown in FIG. 3A whereas what is desirable is as shown in FIG. 3B. This is because the converter 6 does not follow increase further than its maximum (100%) while its output begins to drop immediately when the input becomes negative, and hence the amount DR of the total drop from the 100% level in FIG. 3A equals the amount DR of the total drop from the desirable peak in FIG. 3B. Such characteristics are given to the converter 6 for the purpose of cancelling or counteracting reset windup effects of the controller 2. Thus, the actual response (FIG. 3A) differing from the desirable response (FIG. 3B) gives adverse effects on the process control.

A similar situation, but with opposite polarity, will occur when the direction of the change is opposite and the desirable output of the converter 6 exceeds the lower limit of 0%.

Furthermore, the prior art feed-forward system has the following shortcomings. That is, in the above-described analysis of the feed-forward control system, it has been assumed that the gain coefficient $K_D$ of the transfer function $G_D$ of the disturbance D be constant and consequently that the gain coefficient $K_F = K_D/K_P$ of the feed-forward model 8 be constant. Actually, however, the disturbance coefficient $K_D$ is not fixed, and varies irregularly and widely depending upon such factors as indirect disturbances, variations in characteristics with the passage of time, variations in physical quantities inside and outside of the process control system, variations of chemical compositions, variations in ambient temperature, disturbances which are not detected or cannot be detected and so on. As a result, the feed-forward control system cannot attain desired effects and may adversely affect the process control.

Meanwhile, because of diversity of raw materials, fuels and products, variations in load due to variations in the rate of operation made in view of changes in economical conditions, increasing demand for multipurpose system and the like, there has been an increasing demand for flexibility of the process and hence the control system. This situation is explained in further detail taking, as an example, control on the temperature at the outlet of a heat-exchanger system with reference to FIG. 4.

In FIG. 4, a raw material 11 is fed through a feed line 12 to a heat-exchanger 14, heated by the steam, and is discharged therefrom. A temperature sensor 15 detects the outlet temperature $T_0$ of the heat-exchanger 14 and generates a signal representative of the detected outlet temperature $T_0$. This signal is applied to a temperature controller 19, which controls the heat-exchanger system to maintain the outlet temperature $T_0$ at a predetermined level.

A flow-rate sensor 13 detects the flow rate Fi of the raw material 11 and generates a signal representative of the detected flow rate Fi. This signal is applied to a feed-forward model 21. The output from the feed-forward model 21 and the output from the temperature controller 19 are added in an adder 20, which applies the sum signal, as a target value, to a steam flow-rate controller 22. The steam flow-rate controller 22 receives the output of the steam flow-rate sensor 17 as a feed-back signal and executes control operations for maintaining the feed-back signal at the target value. The output from the steam flow-rate controller 22 is used to control a control valve 18. In this way, the outlet temperature $T_0$ of the heat exchanger 14 is maintained constant.

The transfer function $G_F$ of the feed-forward model 21 will now be discussed. First, the heat balance Q in the steady state of the process is obtained by the following equation:

$$Q = Fs \cdot Hs = \frac{1}{\eta} \cdot Fi \cdot Ci \cdot (Ts - Ti) \qquad (5)$$

where

Fs is the flow rate in weight of steam;
Hs is the latent heat of the steam;
Fi is the flow rate of the raw material;
Ci is the specific heat of the raw material;
Ts is the set or target value for the temperature at the outlet of the heat-exchanger;
Ti is the temperature at the inlet of the heat-exchanger; and
$\eta$ is the efficiency of the heat-exchanger.

Eq. (5) is rewritten so as to obtain the steam flow rate Fs which is the controlled variable. Then, $$Fs = \frac{1}{\eta} \cdot \frac{Ci}{Hs} \cdot (Ts - Ti) \cdot Fi \qquad (6)$$

From Eq. (6), the static compensation component $G_{FS}$ of the feed-forward model 21 is obtained as follows:

$$G_{FS} = \frac{FS}{Fi} = \frac{1}{\eta} \cdot \frac{Ci}{Hs} \cdot (Ts - Ti) = K_F \qquad (7)$$

The transfer function $G_F$ with the dynamic compensation component of the feed-forward model 21 is $$G_F = \frac{1}{\eta} \cdot \frac{Ci}{Hs} \cdot (Ts - Ti) \cdot \left( \frac{1 + T_P \cdot S}{1 + T_D \cdot S} \right) \qquad (8)$$

where $T_D$ is the time constant from the raw material flow rate sensor 13 to the outlet temperature sensor 15; and
$T_P$ is the time constant from the time when the steam flow rate is set (that is, when the output is derived from the adder 20) to the time when the temperature at the outlet of the heat-exchanger 14 is affected by this flow rate set.

So far, only the variation in raw material flow rate Fi is considered as disturbance affecting the feed-forward control system and it has been assumed that $$K_F = \frac{1}{\eta} \cdot \frac{C_i}{H_s} \cdot (T_s - T_i)$$

be constant, but actually $K_F$ varies irregularly over a wide range depending upon the following factors:
(1) the variations in temperature of raw material;
(2) the variations in efficiency of the heat-exchanger;
(3) the variations in the latent heat of the steam;
(4) the variations in ambient temperature; and
(5) the variations of the specific heat of raw material.
As a result, the feed-forward system cannot attain the satisfactory results. More particularly, the controllability is adversely affected when raw material flow rate varies. This results in fluctuation of the product's quality.

As described above, in the prior art combined feed-back and feed-forward control system, satisfactory effects cannot be attained and adverse effects are sometimes brought about. This problem is thus becoming more and more serious as the demand for the flexibility of the process grows.

SUMMARY OF THE INVENTION

An object of the present invention is to provide a method and a system of process control which can substantially eliminate the above and other defects encountered in the prior art methods and systems.

Another object of the present invention is to provide a method and a system of process control whose qualitative characteristics may be easily analyzed and understood so that the adjustment of control for attaining optimum is easy.

A further object of the present invention is to provide a method and a system of process control which can attain optimum results in conformity with characteristics of controlled quantities or values.

A still further object of the present invention is to provide a method and a system of process control which can accomplish optimum compensations for any disturbances.

Another object of the present invention is to provide a process control system which is capable of improving the controllability by restraining the changes in the process quantity to a minimum for any variations in the disturbance.

Another object of the present invention is to provide a process control system which is capable of minimizing the degree of contribution of the FB control to the FB/FF control when the process is in a steady state.

Another object of the present invention is to provide a process control system which is capable of reliably following the variations in the disturbance and process characteristics even when they vary arbitrarily and rapidly.

Another object of the present invention is to provide a process control system which is capable of responding optimally to any of the variations with the passage in time of the process.

According to the invention, there is provided a method and a system for process control comprising in combination a feed-back control in which a manipulated variable is determined in accordance with a deviation of a controlled variable with reference to a target value and a feed-forward control in which a disturbance is detected and a disturbance compensation is determined and used in determining the manipulated variable to counteract the effect of the disturbance, wherein when the control is in a steady state, disturbance compensation is adjusted in such a manner that the difference between the disturbance compensation and the manipulated variable is reduced.

BRIEF DESCRIPTION OF THE DRAWINGS

FIGS. 9a–9j and 10a–10j are the time charts illustrating the operation of the embodiment shown in FIG. 8;

FIGS. 12a–12j are time charts illustrating the operation of the embodiment shown in FIG. 11;

DETAILED DESCRIPTION OF THE PREFERRED EMBODIMENTS

Figure 1:
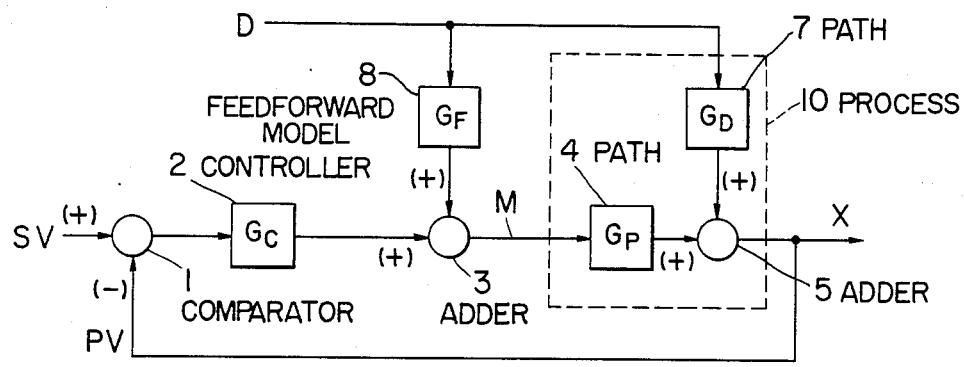
FIG. 1 is a block diagram showing a conventional process control system.
Figure 2:
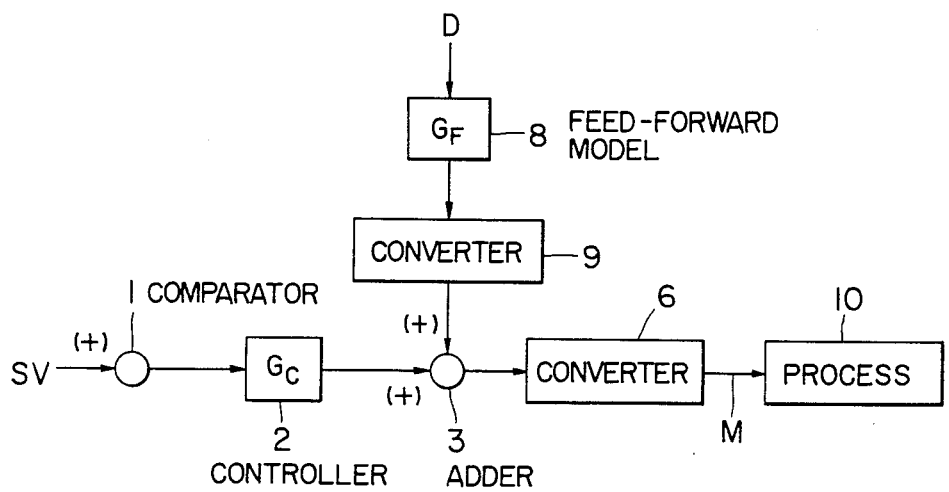
FIG. 2 is a block diagram showing part of another conventional process control system with a velocity-type to position-type converter.
Figure 3A:
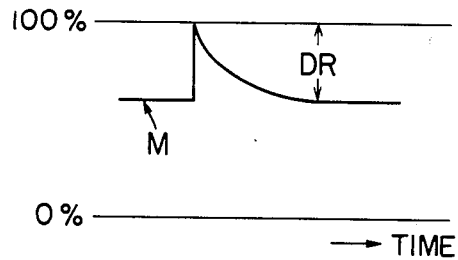
FIGS. 3A and 3B are time charts showing the operation of the system of FIG. 2.
Figure 3B:
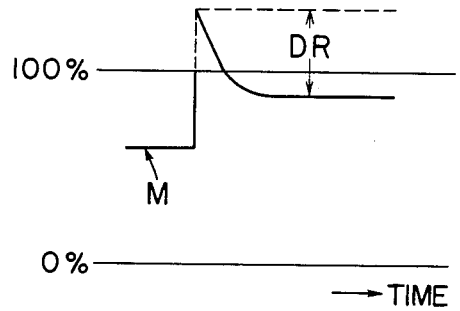
Figure 4:
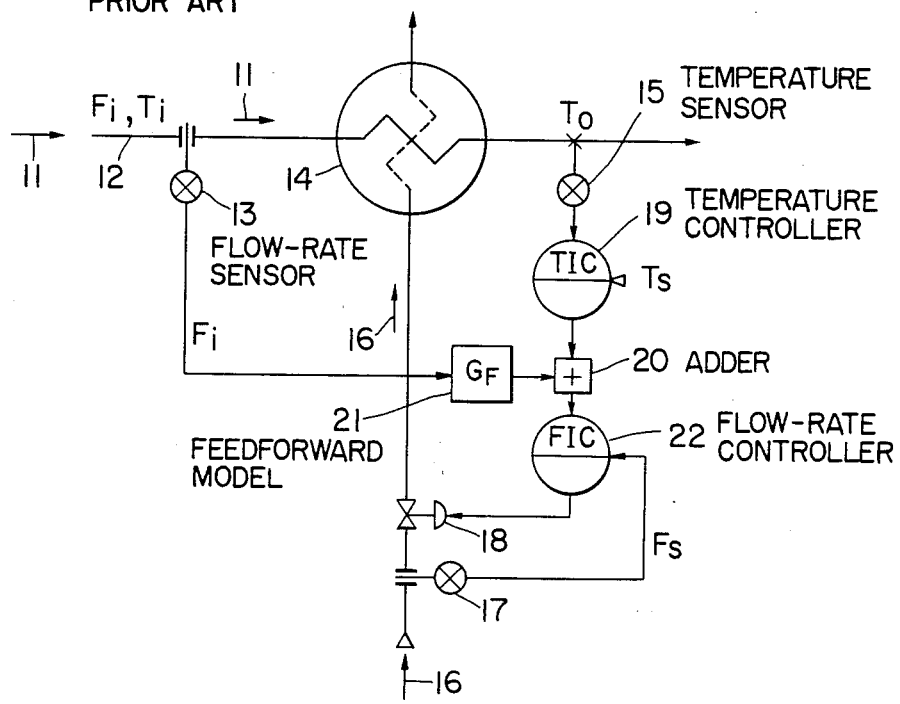
FIG. 4 is a diagram showing an example of a heat exchange system with a process control apparatus.
Figure 5:
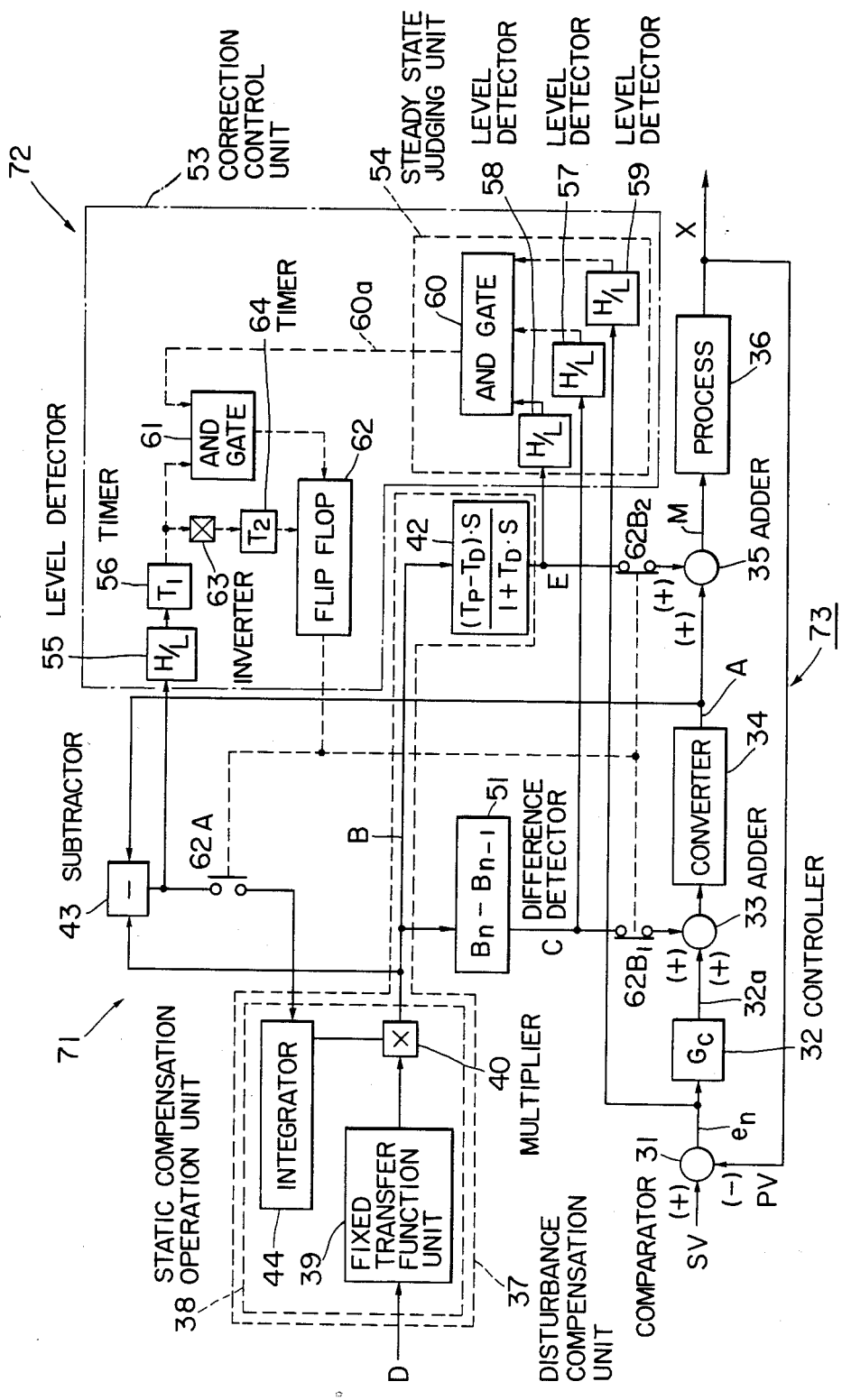
FIG. 5 is a block diagram showing an embodiment of a process control apparatus according to the invention.

FIG. 5 shows an embodiment of the present invention having a velocity-type controller in its feedback system.

A process variable PV which is obtained as a result of the detection of a controlled variable X is fed back to a comparator 31 and is compared with a target value SV. The resulting error, i.e., the deviation $e_n$ of the process variable PV with reference to the target value SV is applied to a controller 32 which executes control operations required for any one or combination of control action for p (proportional), I (integral) and D (derivative). The output 32a from the controller 32 is applied through an adder 33, a velocity type-position type signal converter 34 and an adder 35 to a process 36 as a manipulated variable M. Thus, a feed-back system is formed which feeds the controlled variable X back to the comparator 31 for the control of the process 36.

On the other hand, for feed-forward control, a disturbance signal D is fed to a disturbance compensation unit 37 so that a static compensation component B and a dynamic compensation component E are obtained. The disturbance compensation unit 37 comprises a static compensation component operation unit 38 and an incomplete differentiator 42 which obtains a lagged derivative signal or a lagged rate signal which constitutes the dynamic compensation component E by executing the incomplete differentiation on the static compensation component B derived form the operation unit 38.

The reason why the static and dynamic compensation components B and E are obtained in this way will be now explained. Rewriting Eq. (4), we have $$G_F = -\frac{K_D}{K_P} \cdot \left(1 + \frac{(T_P - T_D) \cdot S}{1 + T_D \cdot S}\right) \quad (9)$$

$$= -\frac{K_D}{K_P} - \frac{K_D}{K_P} \cdot \frac{(T_P - T_D) \cdot S}{1 + T_D \cdot S}$$

The first term of the right side represents the static compensation component B. More particularly, the transfer function or coefficient of the static compensation operation unit 38 is the first term mentioned and the unit 38 delivers the product of its input and the transfer function. The second term of the right side represents the dynamic compensation component; that is, the product of the static compensation component B and the following expression $$\frac{(T_P - T_D) \cdot S}{1 + T_D \cdot S} \quad (10)$$

More particularly, the dynamic compensation component B can be obtained by applying the output from the static compensation component operation unit 38 to the incomplete differentiator 32 which has the transfer function expressed by Eq. (10).

The static compensation component B is applied to a substractor or difference detector 51 which obtains the difference between a static compensation component $B_n$ obtained at the latest (or present) sampling instant and the static compensation component $B_{n-1}$ obtained at the preceding sampling instant, whereby the static compensation component B can be converted into a velocity type. The output C from the difference detector 51 is applied, through a switch 62B$_1$ which will be described later, to the adder 33 and is added to the output 32a form the controller 32. The sum is applied to a converter 34 which converts the sum into a position type signal A. More particularly, the converter 34 effects the velocity-to-position conversion by accumulating the inputs at respective sampling times; that is, by adding the input obtained at one or latest sampling instant to the sum of the inputs previously sampled and accumulated.

The dynamic compensation component or the output from the incomplete differentiator 42 is applied, through a switch 62B$_2$ which will be described later, to the adder 35 to be added to the signal A. The sum or the output from the adder 35 is applied as a manipulated variable M to a process or controlled system 36 to control the controlled variable X.

Figure 6:
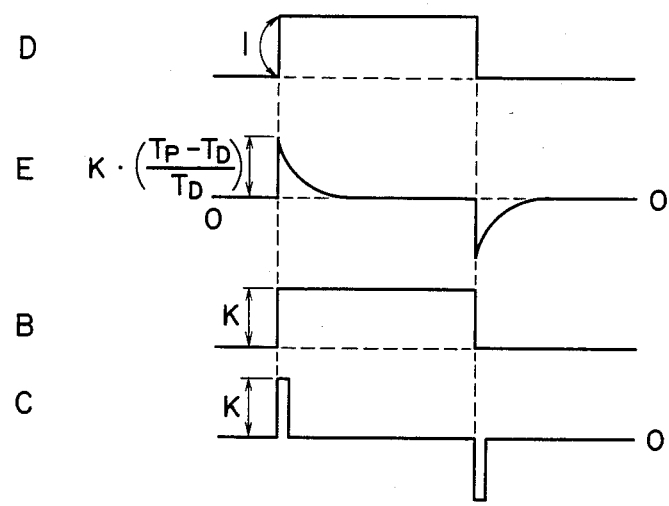
FIG. 6 is a time chart showing operation of the apparatus of FIG. 5.

As long as the switches 62B$_1$ and 62B$_2$ are closed and a switch 62A, which will be described later, is open, the system operates as follows: When the disturbance D changes by a unit "1" (a unit step), the output B from the static compensation operation unit 38, the output C from the difference detector 51 and the output E from the incomplete differentiator 42 respond as shown in FIG. 6. It is seen that in response to the variation in disturbance D, the output E of the incomplete differentiator 42 varies about the zero (0) level; that is, it rises in response to the rise of the disturbance, then falls to 0, drops and goes negative in response to the fall of the disturbance D and rises to zero. The output E remains zero as long as the disturbance D is constant. The output B from the operation unit 38, which is of a position type, is converted into a velocity type by the difference detector 51. The output C from the difference detector 51 immediately rises and falls to zero in response to the rise of the disturbance D and falls below zero and immediately rises back to zero in response to the fall of the disturbance D. As long as the disturbance D remains constant, the output C also remains constant or zero.

As described above, the outputs B and C which represent the static compensation component and the output E representing the dynamic compensation component can be obtained independently of each other so that the analysis of the qualitative characteristics of the system can be considerably facilitated. In addition, a suitable gain (which may be different in magnitude depending upon the direction in which the disturbance is increased or decreased) and a suitable dead band may be determined independently for ech of the static and dynamic compensation components.

Moreover, where a difference detector 51 is used to provide the signal C, not only the signal E representing the dynamic compensation component but also the signal C representing the static compensation component substantially remain zero if the disturbance D remains constant. Therefore, polygonal line function generators may be inserted to receive the signals C and E, respectively, and to apply the outputs to the second and third adders 33 and 35, respectively. Accordingly, different dead bands can be set for static and dynamic compensation components.

Moreover, the control system of the invention has an arrangement wherein the transfer function of the static compensation component operation unit 38 can be modified when the control system is in the steady or stable state.

More particularly, the operation unit 38 comprises a fixed transfer function unit 39, a multiplier 40 and an integrator 44. The integrator 44 keeps integrating an output from a subtractor 43 when a switch 62A is closed. The multiplier 40 generates the product of the outputs from the fixed transfer function unit 39 and the integrator 44 and produces a signal B representing the static compensation component.

The subtractor 43 determines the difference between the output B from the operation unit 38 and the output A from the converter 34.

The switch 62A as well as the switches 62B$_1$ and 62B$_2$ are controlled by the output of a flip-flop 62 in a connection control unit 53.

The correction control unit 53 includes a steady state judging unit 54 for judging whether or not the control system is in steady state. The unit 54 includes first, second and third level detectors 57, 58 and 59. The first level detector 57 is connected to receive the output C of the difference detector 51 and adapted to generate a "high" level signal when the output C is smaller than a predetermined level. The second level detector 58 is connected to receive the output E of the incomplete differentiator 42 and generates a "high" level signal when the output E is smaller than a predetermined level. The third level detector 59 is connected to receive the output $e_n$ of the comparator 31 and generates a "high" level signal when the output $e_n$ is smaller than a predetermined level. An AND gate 60 receives the outputs from the first, second and third level detectors 57, 58 and 59 and delivers a signal 60a indicating that the control system is maintained in the steady state, when the input signals from the first, second and third level detectors 57, 58 and 59 are simultaneously at a "high" level.

A further level detector 55 is connected to receive the output of the subtractor 43 and generates a "high" level signal if the output from the subtractor 43 is greater than a predetermined level. An on-delay timer 56 produces a signal which rises upon expiration of a certain time after the rise of the output of the level detector 55. The output from the timer 56 is applied to both a second AND gate 61 and an inverter 63. The second AND gate 61 generates a "high" level signal when the output 60a of the AND gate 60 and the output of the timer 56 are simultaneously at a "high" level. The flip-flop 62 is set by the "high" level output of the AND gate 61.

An inverter 63 inverts the output of the timer 56. A timer 64 produces a signal which rises upon expiration of a certain time after the rise of the output of the inverter 63. The flip-flop 62 is reset by the "high" level output of the timer 64.

As long as the flip-flop 62 remains in the set state, the switch 62A establishes the connection between the subtractor 43 and the integrator 44 so that the output from the subtractor 43 is integrated. The output of the integrator 44 is applied to the multiplier 40 and multiplied with the output from the fixed transfer function unit 39 so that the transfer function of the operation unit 38 varies accordingly. Simultaneously with the closing of the switch 62A, the switches 62B$_1$ and 62B$_2$ are opened so that the outputs from the difference detector 51 and the incomplete differentiator 42 will not be applied to the adders 33 and 35. The application of these outputs is prevented until the switches 62B$_1$ and 62B$_2$ are closed, i.e., the process is no longer recognized to be in a steady state. This is to prevent application of the effect of the change of the disturbance compensation which is not due to the disturbance change but due to the change in the coefficient used for determining the disturbance compensation to the manipulated variable until the next disturbance change.

The level detector 55 is provided to permit modification of the disturbance compensation only when the difference signal delivered from the subtractor 43 is greater than a predetermined level. When the difference signal is small and negligible, the level detector 55 prevents modification of the disturbance compensation.

The timer 56 which is connected to the level detector 55 is provided to initiate the correction of the disturbance compensation only after the output from the subtractor 43 continues to be large for a certain time interval. Therefore, even if the difference signal rises for a very short time interval; due for example to noise, no correction will be made.

The timer 64 is provided to enable termination of the correction to be a short time after the difference signal becomes lower than the predetermined level.

Of the various members described above, the static component operation unit 38 and the subtractor 43 form a gain adaptive unit 71. The correction control unit 53 and the switches 62A, 62B$_1$, 62B$_2$ form a gain adaptive mechanism 72. The gain adaptive unit 71 and the gain adaptive mechanism 72 form an FF control model gain adjusting unit 73.

As described above, according to the above described embodiment, correction of the transfer function of the operation unit 38 is enabled in such a manner that the static compensation component approaches the output A when the control system is in the steady state. Accordingly, compensation for disturbance can be optimized.

Instead of varying the coefficient of the operation unit 38, the bias applied to the operation unit 38 may be varied to attain similar effects.

In the embodiment of FIG. 5, the control system is found to be in the steady state when the error signal $e_n$, the output C from the difference detector 51 and the output E from the incomplete differentiator 42 are smaller than their respective predetermined levels. But it is to be understood that any other suitable variables or parameters may be used for judgement as to whether or not the control system is in the steady state.

Figure 7:
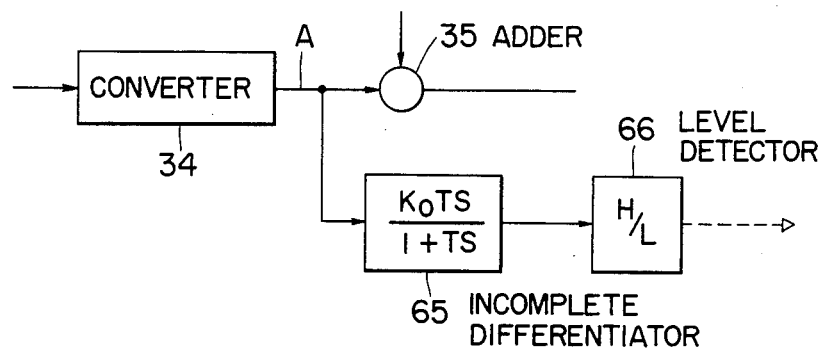
FIG. 7 is a block diagram showing a modification of part of the embodiment of FIG. 5.

For instance, the arrangement may be as shown in FIG. 7, where the output A from the converter 34 is fed to an incomplete differentiator 65 and the output of the latter is applied to a level detector 66 judging whether the output is greater or smaller than a predetermined level. Whether or not the control system is in the steady state can be judged in accordance with the result of the judgement by the level detector 66.

The component parts of the control systems of the types described above may be either of analog or digital type, may be formed of discrete components or may be in the form of a programmed computer.

Figure 8:
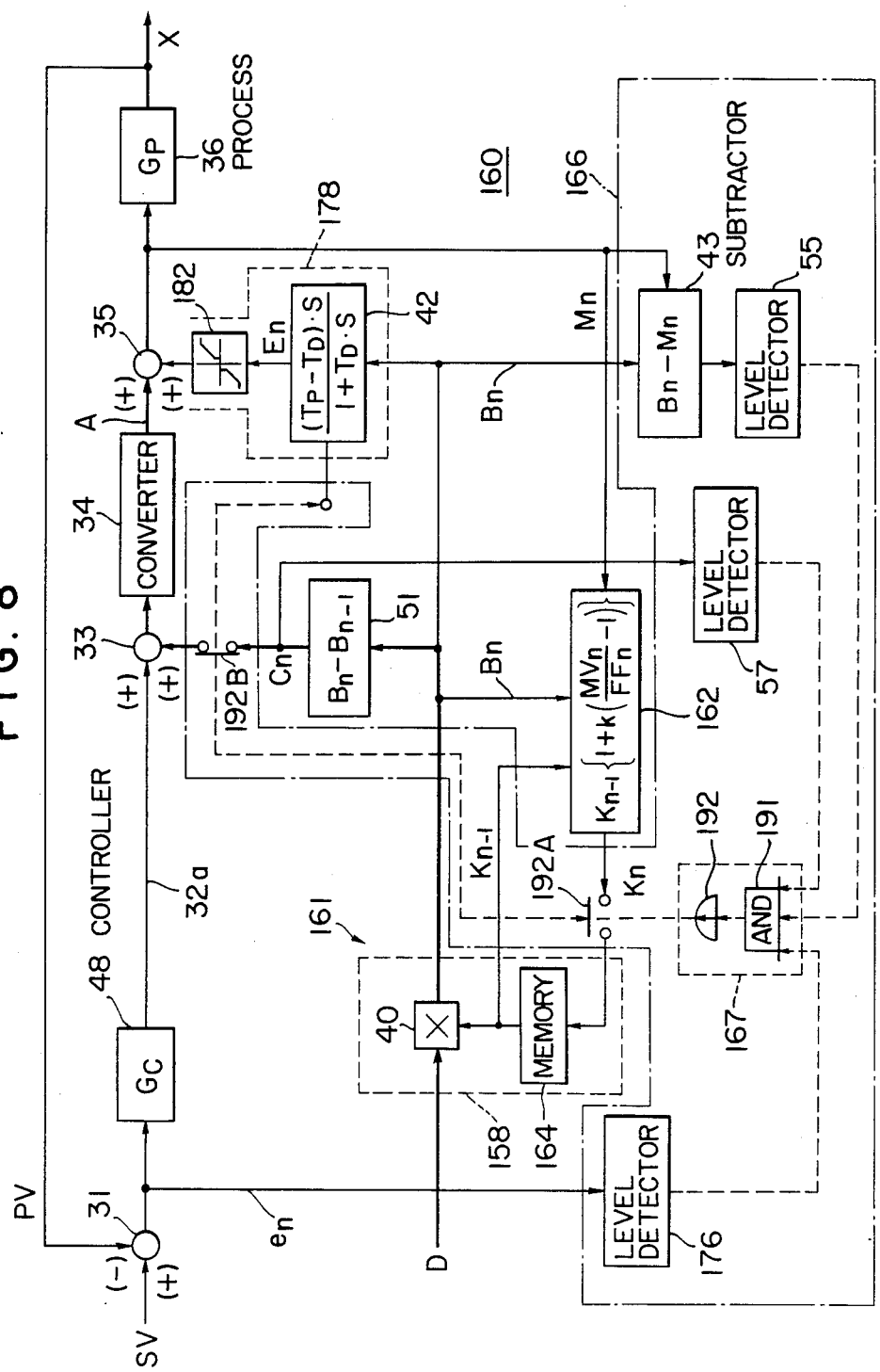
FIG. 8 is a block diagram showing a further embodiment of the invention.

FIG. 8 shows another embodiment of the invention, which is similar to the embodiment of FIG. 5. In FIG. 8, the components similar to those in FIG. 5 are identified by the same reference numerals.

The control system of this embodiment comprises an FF control model gain adjustment unit 160 which comprises an FF model gain correction unit 162 and an FF model gain adaptive mechanism 166. The FF model gain correction unit 162 and the FF control model 158 form an FF model gain correction system 161. The FF model gain correction unit 162 receives the disturbance compensation signal Bn which is the output signal of the FF control model 158 and the manipulated signal Mn, computes a correction value for the FF control model that tends to reduce the difference between the above two signals, and outputs the correction value to the FF control model 158 to automatically correct its gain.

Furthermore, the FF control model 158 of this embodiment comprises a gain memory 164 which stores the correction signal from the FF model gain correction unit 162, and a multiplier 40 which receives a signal from the memory and a disturbance signal D to compute and output a disturbance compensation signal Bn. The FF model gain correction unit 162 has a function which is represented by the following expression.

$$K_{n-1}\left\{1 + k\left(\frac{Mn}{Bn} - 1\right)\right\}$$

In the above expression, $K_{n-1}$ represents the FF model gain at the previous sampling instant, Mn is the present manipulated quantity, Bn is the present FF quantity and k is the correction coefficient.

This expression permits one to select any of three correction modes by setting and changing the correction coefficient k.
(1) When set to k=0, it gives $K_n = K_{n-1}$ where no correction of the gain is executed.
(2) When set to k=1, it gives $$K_n = K_{n-1} \times \frac{Mn}{Bn}$$

where the correction of the FF model gain is executed in one operation.

(3) When set to $0<k<1$, it gives $$K_n = K_{n-1}\left(1 + k\left(\frac{Mn}{Bn} - 1\right)\right)$$

where the correction is executed in steps. Ordinarily, k is set to unity. The FF model gain $K_n$ from the FF model gain correction unit 162 is stored in the memory 164. When the process is in a steady state and at the same time the difference between the FF control output and the manipulated variable is found to exceed a prescribed value, and such a state continues longer than a prescribed time length, then the adaptive mechanism 166 controls the supply of the FF model gain $K_n$ to the memory 164 and controls the additional synthesis of the FB control signal to the disturbance signal. The FF model gain adaptive mechanism 166 includes switches 192A and 192B that are inserted between the FF model gain correction unit 162 and the memory 164 and between the position-velocity converter 51 and the adder 33, respectively, a subtractor 43 which determines the difference between the FF control output Bn and the manipulated variable Mn, a level detector 55 whose output is at a "high" level when the difference Bn-Mn exceeds a prescribed value, a level detector 57 whose output is "high" when the FF compensation is small, and a level detector 176 whose output is "high" when the variation in the control deviation within a prescribed time interval, i.e., the difference between the maximum and the minimum values within the time interval is small. The outputs of the level detectors 55, 57 and 176 are supplied to an AND gate 191, whose output is fed to an ON-delay timer 192. As long as the output of the timer 192 is "high", the switch 192A is closed, the switch 192B is open, and the incomplete differentiator 42 is kept initialized, i.e., its output is kept at zero.

Furthermore, in the control system of this embodiment there is provided a dynamic compensation circuit 178 which compensates for the dynamic characteristics. The compensation circuit 178 comprises an incomplete differentiator 42 and a directivity table 182 which determines the direction of the dynamic compensation component from the incomplete differentiator 42. The directivity table also provides a dead band and an upper and a lower limits.

In the FF model gain adaptive mechanism 166 with the above construction, when the difference between the FF control output Bn and the manipulated quantity Mn exceeds a prescribed value, when the change in the disturbance is small, and when the variation in the control deviation is small, then the control system is recognized to be in a state requiring correction of the FF control mode. When the control system is continuously recognized to be in such a state longer than the delay time of the timer 162 the switch 192A is closed, and the switch 192B is opened. Therefore, the FF model gain $K_n$ from the FF model gain correction unit 162 at that instant is not stored in the memory 164. However, the FF model gain $K_{n-1}$ which was stored at the previous sampling instant is multiplied by the disturbance D at the multiplier 40, and is supplied to the adder 33 through the converter 51.

Next, the operation which is performed when the correction coefficient k in the FF model gain correction unit 162 equals to unity, namely, the the correction of the FF model gain is executed in a single step, will be described by referring to FIGS. 9a–9j. In FIGS. 9a–9j, the position type signals will be used to facilitate the understanding of the operation.

When a disturbance varies as shown in FIG. 9a, the FF control operates first to compensate the influence of the disturbance variation on the process. The FF control multiplies the disturbance signal D with the FF model coefficient, shown in FIG. 9h, which is set in the memory 164, and outputs a disturbance compensation signal Bn as shown in FIG. 9d. The converter 51 finds the difference between the disturbance compensation signal $B_{n-1}$ for the preceding sampling instant, and outputs a velocity-type signal Cn (FIG. 9e) which corresponds to the variation in the disturbance compensation signal. The adder 33 adds the velocity-type signal Cn and a velocity-type FB control output signal 32a from the FB controller 132. The resulting sum signal is converted to a position-type FB/FF control output signal by a velocity to position converter 34. The disturbance compensation signal Bn is supplied also to the incomplete differentiator 42 to produce a dynamic compensation signal En, as shown in FIG. 9f, for adjusting the lead/lag in the disturbance compensation signal Bn. The signal En is output through the directivity table 182 to the adder 35 where it is added to the FB/FF signal from the converter 34, to produce a manipulated variable M, as shown by FIG. 9c, to be output to the process 36.

Through the FF control, the disturbance influence, such as the load variation, is compensated. But there remains an influence that cannot be compensated as shown by FIG. 9b. At the comparator 31, the deviation of the controlled variable PV from the set value SV is computed, and the FB controller 32 executes a PID operation on the deviation and supplies a velocity-type FB control output 32a to the adder 33. The FB control is for correcting the deviation that cannot be estimated by the FF control.

In this way, it is possible to compensate for the deviations that persist even under the use of the FF control, by adopting an FB control, to attain a control with satisfactory stability and responsiveness. However, there arise some errors in the FF model coefficient of the FF control due to the variations with the passage in time in the environment and others for the process, so that it will be seen, as shown by FIG. 9c, that there is output a certain amount of FB control signal in spite of the fact that the control remains stable. Namely, when the control system is found to be in a state requiring the FF control model correction as shown by FIG. 9j, a state judging unit 67 detects such a state and causes the switch 192A to close and the switch 192B to open, and outputs a signal that initializes the incomplete differentiator 42. When the switch 192A is closed, the FF model coefficient, which is computed for all times at the FF model gain correction unit 162, based on the FF model coefficient for the preceding time, the FF control output Bn, and the manipulated variable M, is output to the memory 164 and updated as shown by FIG. 9h. Due to variations in the FF model coefficient value, there arise variations as shown by FIG. 9b in the disturbance compensation signal Bn (the FF control output). Because of such a variation there is output from the position to velocity converter 51 a velocity-type signal which corresponds to the quantity of variation. However, this signal will not be applied to the adder 33, as shown by the dotted line in FIG. 9e, since at that time the switch 192B is open. Such an arrangement prevents application of the effect of the change in the FF output which is not due to the disturbance change but due to the FF model correction, to the manipulated variable until the next disturbance change.

In addition, when the disturbance compensation signal Bn is corrected and is made equal to the value for the manipulated variable M by the FF model correction, the state judging unit 167 outputs a signal which reinstates the switches 192A and 192B to steady states (192A open and 192B closed). Here, it should be noted that the signal is output with some time delay.

Figure 9G:
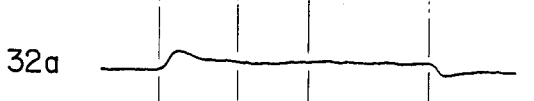
Figure 10G:
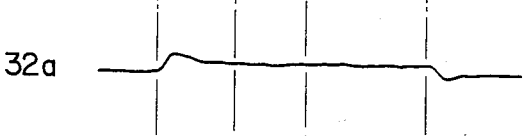

When the FF model is thus corrected, an FF control will be executed based on the corrected coefficient at the time of the next variation in the disturbance. It therefore becomes possible to reduce the FB control at the time of stable control, as shown by FIG. 9g, realizing an optimum FF control.

Next, a description will be given for the case when the correction coefficient k of the FF model gain correction unit 162 is 0.2, by referring to FIGS. 10a–10j. Here, the description of the operations that are the same as for FIGS. 9a–9j will be omitted.

When the correction coefficient k is chosen to be less than unity, the correction is executed stepwise by finely adjusting the FF model coefficient using the degree of contribution corresponding to the component obtained by multiplication with this value of k. This is to restrain the correction when the variation in the manipulated variable is instantaneous. That is, when the correction is carried out by using, without change, the FF model correction from the FF model gain correction unit 162 with k=1, it is possible that correction is effected even if the variation in the process variable is instantaneous. The coefficient "k<1" is adopted to avoid such an excessive response and to effect the correction gradually. In this case, it is appropriate to set the thresholds for the deviation of the level detectors 55, 57, 176 to minute values that are desired.

In operation, based on the fulfilment of the condition for each level detector, the state judging unit 167 operates so as to close the switch 192A and open the switch 192B. Then, a finely corrected quantity computed in proportion to the value of K, at the FF model gain correction unit 162, based on the difference between the FF control output B and the manipulated variable M, is output to the memory 164 as shown in FIG. 10h, and the FF control output B varies by the finely corrected component as shown by FIG. 10d. The variation in the FF control which is output from the converter 51, is prevented from being applied to the adder 33 by means of the switch 192B. The finely corrected FF control output B is input to the FF model gain correction unit 162 where it is compared with the manipulated variable for that point in time, and a finely corrected quantity based on their difference is output to the memory 164. In a similar manner, the FF model coefficient is corrected stepwise until the FF control output B becomes equal to the manipulated variable M.

Figure 11:
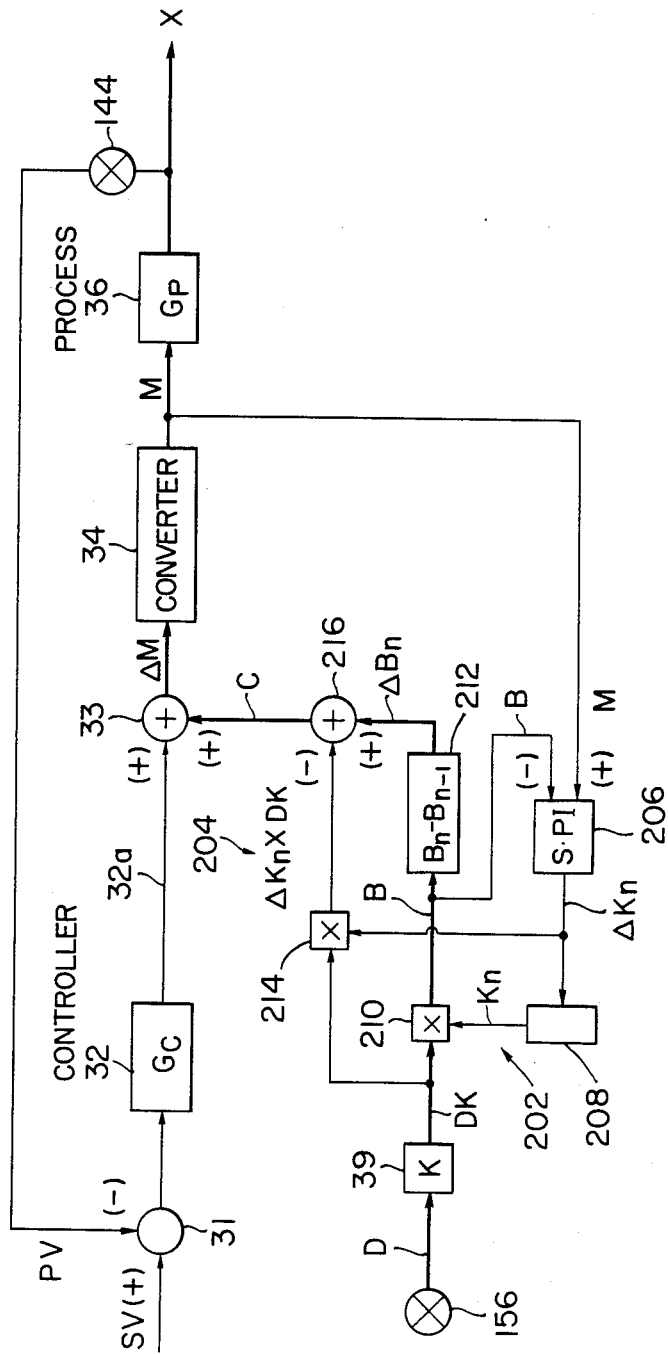
FIG. 11 is a block diagram showing a further embodiment of the invention.

Referring now to FIGS. 11 and 12, a further embodiment of the process control system will be described. In the embodiment shown in FIG. 11, those elements that are the same as in the simplified device shown FIG. 8 will be given the same reference numerals and their explanation will be omitted.

The process control system of this embodiment is suitable for use with a nonmixing process or the like.

In this embodiment, the FF model gain adaptive unit 160 includes a disturbance compensation signal correction system 202 and a correction influence compensation system 204.

The disturbance compensation signal correction system 202 is for correcting the disturbance compensation signal B to be equal to the manipulated variable M that is output to the process 36. The correction influence compensation system 204 is to compensate a disturbance compensation signal (called hereafter as a corrected disturbance compensation signal) Bn which is corrected by the disturbance compensation signal correction system 202 to have no influence of correction. That is, these two systems 202 and 204 execute, based on the correction signal from a sample value control unit 206, an automatic correction and a compensation operation of the disturbance compensation signal DK so as to minimize the degree of contribution of the FB control to the FB/FF control by setting the manipulated variable M and the corrected disturbance compensation signal Bn equal. The sample value control unit 206 executes a smaple value control such as a P operation, a PI operation, or the like, and outputs the deviation between the manipulated variable M and the corrected disturbance compensation signal Bn or an adjusted value for correcting the deviation, as a correction signal $K_n$. In this embodiment, description will be given on the assumption that the correction signal is a velocity type signal and is a deviation signal due to the P operation.

The velocity type correction signal $\Delta K_n$ is supplied to the disturbance compensation signal correction system 202 and the correction influence compensation system 204. After converting the correction signal $\Delta K_n$ to a position type signal $K_n$ by a velocity type signal to position type signal converter 208, the disturbance compensation signal correction system 202 multiplies the position type signal $K_n$ by the disturbance compensation signal DK by means of a multiplier 210, to carry out an automatic correction of the disturbance compensation signal DK. The corrected disturbance compensation signal Bn thus obtained is fed back as a feedback signal to the sample value control unit 206 and is also supplied to a position type signal to velocity type signal converter 212 to be converted to a velocity type signal $\Delta Bn$. The correction influence compensation system 204 multiplies the velocity type correction signal $\Delta K_n$ with the position-type disturbance compensation signal DK at a multiplier 214 to obtain a velocity-type influence compensation signal $\Delta K_n \times DK$ which is output to a compensator 216. At the compensator 216 the influence on the manipulated variable M due to the correction operation by the disturbance compensation signal correction system 202 is compensated for by subtracting the influence compensation signal $\Delta K_n \times DK$ from the velocity-type corrected disturbance compensation signal $\Delta Bn$.

Thus, according to the automatic correction and its function as a compensation operation for the disturbance compensation signal DK, which is the characteristic aspect of the embodiment, the sample value control unit 212 obtains, periodically or as need arises, the differences between the manipulated variable M and the corrected disturbance compensation signal Bn, as a velocity-type correction signal $\Delta K_n$ that represents the quantity of variation. The disturbance compensation signal correction system 202 multiplies the disturbance compensation signal DK by the value $K_n$ which is obtained by accumulating the velocity-type correction signal $\Delta K_n$ up to the previous sampling instant. The correction influence compensation system 204 multiplies the correction signal $\Delta K_n$ by the disturbance compensation signal DK, to obtain the correction compensation DK $\times \Delta K_n$ of the disturbance compensation signal for the variation component corresponding to the present sampling instant. The correction component is removed from the corrected disturbance compensation signal $Bn = DK \times K_n = DK \times (\Delta K_n + K_{n-1})$ to compensate for the irregularity due to the present correction component in the FF control output.

The operation of the present embodiment will now be described by referring to FIGS. 12a–12j. FIGS. 2a–12j are the time charts illustrating the variations of each signal in response to the process variations and the disturbance. In this embodiment, the automatic correction and the compensation operation of the disturbance compensation signal DK are arranged to be carried out in correspondence with the sampling period of the sample value control unit 206, where the sampling period can be set freely in accordance with the responsiveness of the process. Here, it is assumed that an initial state of the process in which the disturbance signal DK is in a stationary level $i_o$ and the adjusted quantity of the manipulated signal M is increased from the stationary level $i_o$ by $\alpha\%$ in response to the process variable variation. Furthermore, the variation quantity of the disturbance signal DK and the variation quantity of the process variable ar assumed to be $\alpha\%$ to facilitate the explanation. However, needless to say, the present embodiment will operate as well for any variation quantity.

First, the automatic correction and compensation operation of a first round will be described. The first round operation will be executed for the process in the initial state, namely, for the case in which the process quantity varies by $\alpha\%$ in response to the prescribed value. The sample value control unit 206 carries out a P operation by taking the manipulated signal M $(=i_o \times (-1+\alpha))$ as a set value and the corrected disturbance compensation signal Bn $(=i_o)$ as a feedback signal, to bring these values to coincidence, and outputs their deviation as a velocity-type correction signal $\Delta K_n$ $(=K\alpha)$. The correction signal $\Delta K_n$ is converted to a position-type signal $K_n[=K(1+\alpha)]$ which represents the result of accumulation of the velocity-type correction signal $\Delta K_n$, by the velocity-type signal to position-type signal converter 208 in the disturbance compensation signal correction system 202, and the signal $K_n$ is multiplied with the disturbance compensation signal DK $(=i_o)$ at the multiplier 210. After the disturbance compensation signal DK is automatically corrected and taken out as a corrected disturbance compensation signal Bn $(=i_o \times i_o \times K(1+\alpha))$, it is converted to a velocity-type signal $\Delta B_n (=i_o \times K\alpha)$ in the position-type signal to velocity-type signal converter 210.

Furthermore, the correction signal $\Delta K_n$ $(=K\alpha)$ is multiplied with the disturbance compensation signal DK at the multiplier 214 in the correction influence compensation system 204, and is output as a velocity-type influence compensation signal $\Delta K_n \times DK$ $(=i_o \times \alpha)$ to the compensator 216 where it is subtracted from the velocity-type signal $\Delta Bn$. The output thus obtained has a value "zero" and is supplied as a velocity-type FF control signal C $(=\Delta Bn - \Delta K_n \times DK=0)$ to the adder 33 and is summed with the velocity-type FB control signal $32a(=0)$ in the adder, to be output as a velocity-type manipulated signal $\Delta M$. The manipulated signal $\Delta M$ is converted to a position-type manipulated signal M by the velocity-type signal to position-type signal converter 34 and is output to the process 36.

In this manner, in the first round operation, the correction signal $\Delta K_n$ for the controlled sample value which makes the FB control output zero is maintained by converting it to a position-type signal at the disturbance compensation signal correction system 202. As a result, the position-type signal Bn becomes to have an equal value to the position-type manipulated signal M. Further, it is compensated at the correction influence compensation system 204 as a variation component of the controlled sample value with respect to the preceding sample value (the present variation quantity for the first round operation), so that the disturbance compensation signal DK is output as the FF control output (the variation quantity of the disturbance compensation signal DK for the FF control output is zero as it is a velocity-type signal).

When the process variable or the disturbance signal changes during the period after completion of such an automatic correction and compensation operation and before the control for the next sample value, there are output, as shown by FIG. 12, an ordinary FB control signal $32a$ and an FF control signal C to control such a change. Due to this control, the manipulated signal M which was equal to the corrected disturbance compensation signal in the first round of sample control also changes. That is, although the corrected disturbance compensation signal Bn varies in response to the changes in the disturbance signal alone, the manipulated signal M varies under the influence of changes in the process variable, namely, the changes in the FB control signal, in addition to the changes in the disturbance signal. Therefore, it is possible to reduce the degree of contribution of the FB control in the FF/FB control, since the influence of the FB control signal can be dissolved by carrying out an automatic correction so as to have the corrected disturbance compensation signal Bn to be equal to the manipulated signal M.

During the third period of sample value control, the manipulated signal does not remain equal to the corrected disturbance compensation signal Bn $(=i_o \times (1+\alpha)$ due to the variation (from $i_o \times (1+\alpha$ to $i_o$) responsive to the change in the process variable outside of the period of the sample value control. Then, with the start of synchronization of the control, the manipulated signal M and the corrected disturbance compensation signal Bn (the signal prior to the automatic correction by the present sample control, that is, the value obtained by multiplying the disturbance compensation signal DK at the start of the present sample control with the position-type correction signal $K_n$ for the previous sampling) at that time undergo a p operation at the sample value control unit 206, and their deviation is output as a velocity-type correction signal $\Delta K_n$ $(=-\alpha)$. The correction signal $\Delta K_n$ is added to a position-type correction signal $K_{n-1}$ which is being held in the converter 208 of the disturbance compensation signal correction system 202, and the resulting correction signal $K_n$ changes from $k(1-\alpha)$ to k and the disturbance compensation signal DK is automatically corrected hereafter by this changed correction signal. The corrected disturbance compensation signal Bn is corrected by this automatic correction to the value that is equal to the manipulated signal M, as shown in FIGS. 12a–12j.

Moreover, the correction signal $\Delta K_n$ is multiplied by the disturbance compensation signal DK at the correction influence compensation system 204, and the resulting influence compensation signal $\Delta K_n \times DK$ ($= -i+2$) removes the FF control signal which was generated by the automatic correction independently of the variations in the disturbance, thereby to compensate for the irregularity in the control system due to automatic correction.

Next, during the fourth and the fifth periods of sample value control, the FF control has zero output, the disturbance compensation signal DK is changing and an ordinary FF control is carried out. That is, the FF control signal 32a which is output is a variation component of the disturbance compensation signal.

In this way, in the present embodiment, automatic correction is carried out using the controlled sample value so as to make the manipulated signal M and the disturbance compensation signal B equal to each other. Therefore, it is possible to reduce markedly the degree of contribution of the FB control to the FF/FB control by compensating for the variation component in the sample-controlled value that is generated by the automatic correction and is not directly affected by the disturbance variations.

Furthermore, although in the above-described embodiment, the sample value control unit 206 outputs the deviation between the corrected disturbance compensation signal Bn and the manipulated signal M as a velocity-type signal, the sample value control unit 206 may be made to have a construction which outputs the deviation as a position-type signal.

Figure 13:
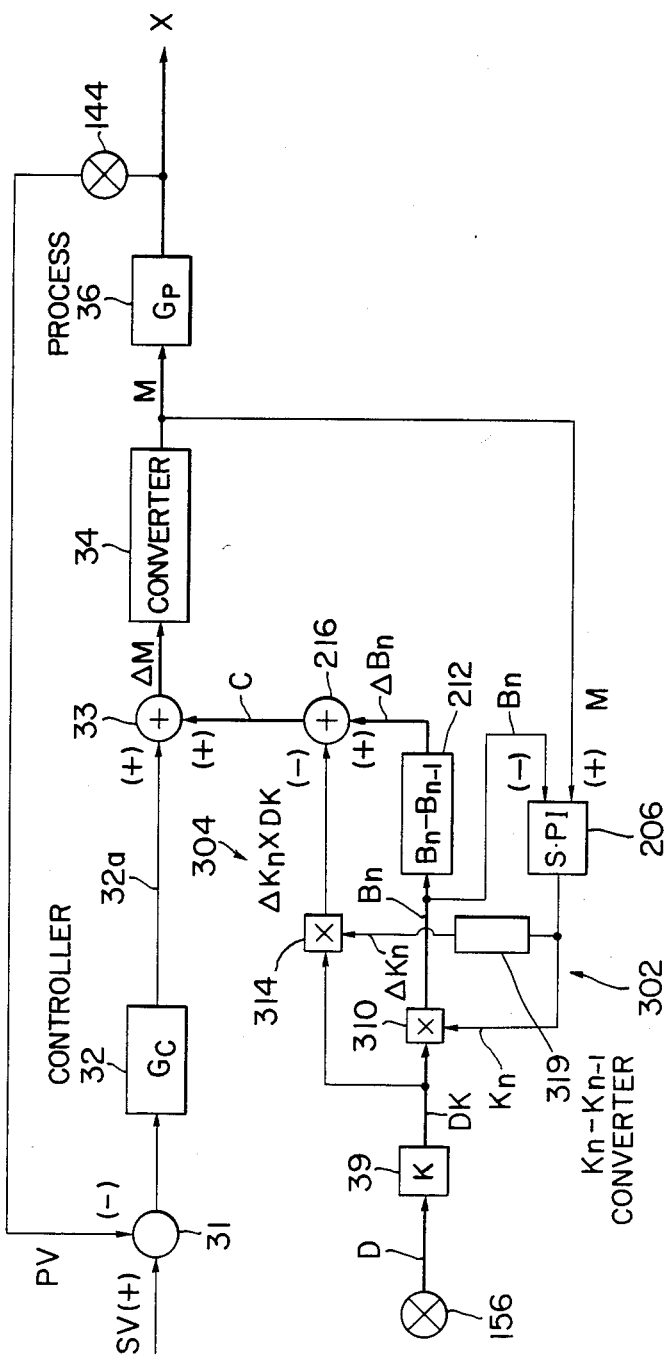
FIGS. 13 shows a modification to the process control apparatus shown in FIG. 11.

For example, a construction as shown in FIG. 13 may be considered in which a disturbance compensation signal correction system 302 includes of a multiplier 310, and a correction influence compensation system 304 has a construction where a position-type to velocity-type converter 319 which converts a position-type correction signal to a velocity-type signal is added. In this construction, the disturbance compensation signal correction system 302 multiplies the position-type correction signal $K_n$ which is output from the sample value control unit 306 by the disturbance compensation signal DK at the multiplier 310 to carry out an automatic control. Also, the correction influence compensation system 304 converts the position-type correction signal $K_n$ to a velocity-type signal at the converter 319. The variation component $\Delta K_n$ from the previously controlled sample value is multiplied at the multiplier 314 by the disturbance compensation signal DK to obtain an influence compensation signal with which to compensate for the correction.

Furthermore, in the above embodiment, the automatic correction mechanism of the disturbance compensation signal and the function of compensating for the influence due to the correction have been described to be using a hardware construction which is capable of accomplishing these functions. These functions may alternatively be attained by means of a computer software.

Figure 14:
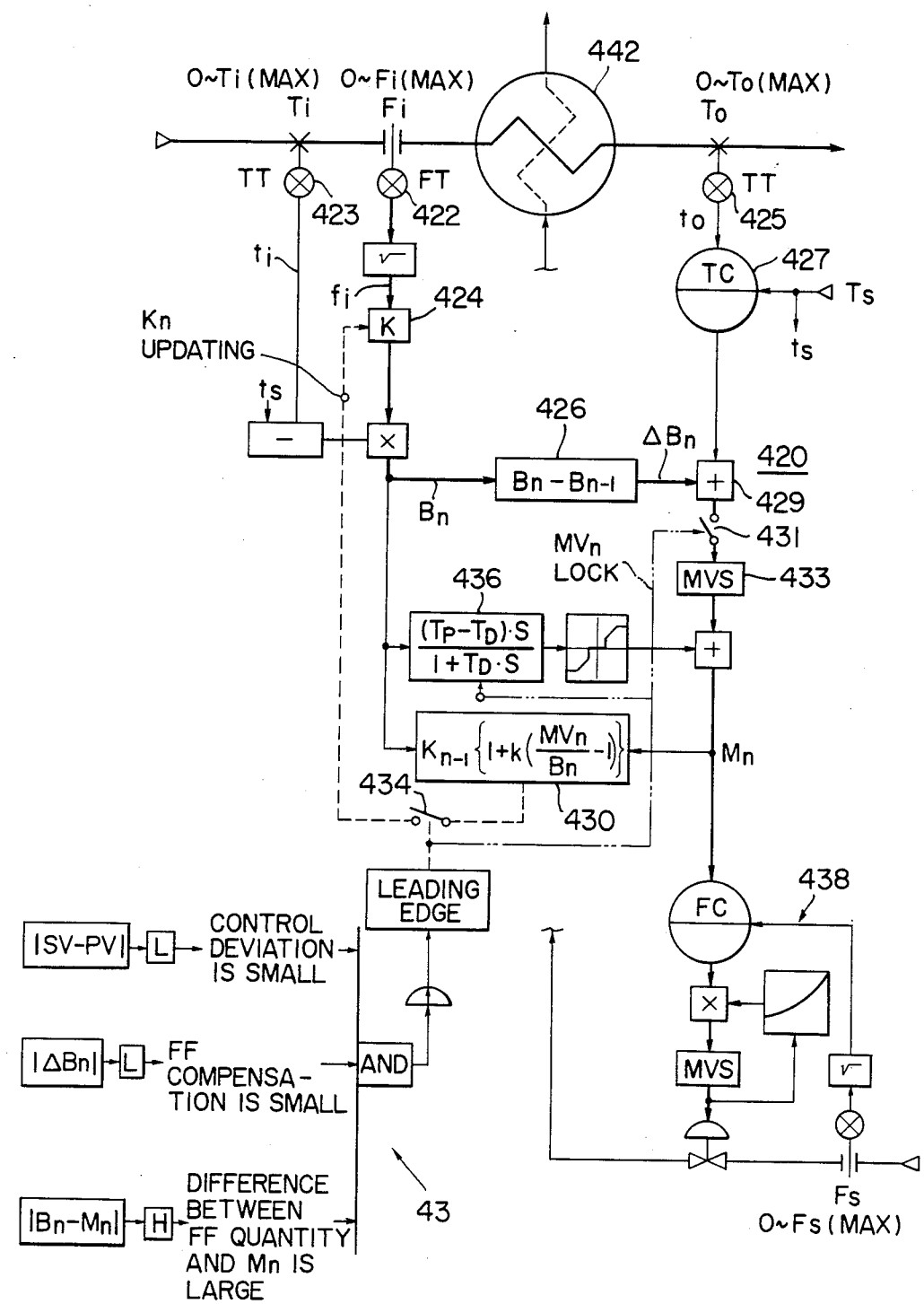
FIG. 14 is a block diagram illustrating an example of application of the process control system in accordance with the present invention to the control on the temperature at the outlet of a heat exchanger.

Referring now to FIG. 14, an example of applying the process control apparatus in accordance with the present invention to the temperature control for controlling the temperature at the outlet of a heat exchanger will be described.

The temperature control system 420 is for controlling the temperature To at the outlet of the heat exchanger 442 at a set temperature Ts. The temperature To at the outlet of the heat exchanger is detected by a detector 425, and a controller 427 executes a control operation based on the detected temperature To and the set temperature Ts, outputting the result as a velocity-type FB control output signal. The FB control output signal is output through an adder 429, and a switch 431 to a velocity-type signal to position-type signal converter 433 where it is converted to a position-type manipulated signal. This position-type signal, after summed with the dynamic compensation component, is output to a valve characteristic compensation unit 438 to adjust the flow rate of the thermal fuel to be supplied to the heat exchanger. Further, the disturbance detectors 422 and 423 detect the disturbances in the flow rate and the temperature of the raw material sent in as Fi and Ti, respectively. The disturbance signal D is multiplied by the static compensation coefficient K by the FF control model 424 to be converted to a disturbance compensation signal. The disturbance compensation signal is converted to a velocity-type signal by the position-type signal to velocity-type signal converter 426, added to the FB control output signal at the adder, and is sent to the valve characteristic compensation unit 438 as a control output signal in which the disturbance is compensated for. The compensation coefficient K is computed by the FF model correction unit 430 to give a compensation quantity which equalizes the position-type manipulated signal and the disturbance compensation signal, and is updated when the switch 434 of the FF model gain adaptive mechanism 432 is closed upon the fulfilment of a prescribed driving condition. The compensation coefficient K is determined by the following equation.

$$K = \frac{\rho \times Ci}{\eta \times Hs} \times \frac{Fi(\text{MAX})}{Fs(\text{MAX})} \times To(\text{MAX})$$

Here, $\rho$ is the specific gravity of the raw material, Ci is the specific heat of the raw material, $\eta$ is the heat exchange rate, and Hs is the latent heat of the steam. The disturbance compensation signal is sent further to the dynamic compensation circuit 436 where it is added to the output of the converter 433 as a dynamic compensation signal to produce a manipulated variable Mn. The manipulated quantity Mn thus obtained as to the dynamic characteristic is sent to the valve characteristic compensation unit 438 to control the valve which supplies the steam to the heat exchanger.

As described above, combining an FB control with an FF control having the automatic correction function for its control model gain, the following advantages are attained.

(1) It is possible to strengthen the responsiveness to any variations of the process disturbance whatsoever, and also to enhance the controllability.

For instance, in a flow control, it is possible to promptly respond to changes in the process dynamic characteristics due to sudden changes in the disturbance. In a temperature control, even when there are long-term variations in the ambient temperature, such as the day-night and the seasonal changes, it is possible to optimize the control. It is thus possible in either case, to restrain the variations in the process quantity to a minimum.

It is therefore possible to attain a marked improvement in the quality of products, reduction in energy consumption, and saving of the natural resources.

(2) Using a simple construction which does not require a difficult mathematical theory, it is possible to apply the device to any process to serve as a means for a flexible production.

(3) Without requiring complicated and extra search signals, it is possible to eliminate a cause of the shocks to the operation terminals and other parts, to improve the process reliability markedly.

Although a description was given in the above embodiment in terms of the examples of the hardware which can realize each function of an FB control, an FF control, a gain scheduling, and an FF model gain adaptation, it is possible in the present invention to accomplish these functions by means of the computer softwares.

Furthermore, processing of the operation for each function may be accomplished in terms of either a position-type signal or a combination of a position-type signal and a velocity-type signal.

In summary, in accordance with the present invention, it is possible to restrain the variations in the process quantity to a minimum for any disturbance, and to attain an optimum adaptive control by improving the controllability to an extremity. In addition, it is possible to provide a process control device which is simple and can easily be put into multipurpose use.

Various modifications will become possible for those skilled in the art after receiving the teachings of the present disclosure without departing from the scope thereof.

What is claimed is:

1. A process control system which adapts itself optimally to variations in disturbance, comprising:
   feedback control means for outputting a feedback control signal that is computed by comparing a set value and a process value;
   feedforward control means for detecting a disturbance and for outputting a disturbance compensation signal to compensate for the disturbance based on a feedforward control model; and
   gain adaptive means for comparing said disturbance compensation signal and a manipulated signal, which is a function of said feedback control signal and said disturbance compensation signal, and for correcting the gain of said feedforward control model so that the difference between the disturbance compensation signal and the manipulated signal is reduced.

2. A system as claimed in claim 1, in which the gain adaptive means corrects the gain of the feedforward control model so that the feedback control signal outputted from the feedback control means is reduced.

3. A system as claimed in claim 1, in which the gain adaptive means corrects periodically the gain of the feedforward control.

4. A system as claimed in claim 1, in which the gain adaptive means judges the magnitude of the gain of the feedback control signal or the manipulated signal, and corrects the gain of the feedforward control model when it exceeds a prescribed level.

5. A system as claimed in claim 4, in which the gain adaptive means comprises a correction unit with a transfer function as shown by the following equation:

$$K_{n-1}\left\{1 + k\left(\frac{Mn}{Bn} - 1\right)\right\}$$

wherein $K_{n-1}$ is the gain of the feedforward model for the preceding time, Mn is the manipulated quantity for the present time, Bn is the feedforward quantity for the present time, and k is a correction coefficient.

6. A system as claimed in claim 5, in which the correction coefficient k in the gain correction unit is equal to unity.

7. A system as claimed in claim 5, in which the correction coefficient k in the gain correction unit satisfies the relation $0 < k < 1$.

8. A system as claimed in claim 1, in which the feedforward control model comprises a gain memory for storing the gain correction signal from the gain adaptive means and an operational means for receiving the correction signal from the gain memory and the disturbance signal to compute and output the disturbance compensation signal.

9. A system as claimed in claim 8, further comprising a gain adaptive mechanism for permitting the supply of the gain correction signal to the gain memory when detecting a state in which the process is steady, the control is set, and the difference between the disturbance compensation signal and manipulated quantity exceeds a prescribed value and continues for a predetermined time length, and for controlling the generation of the function of the disturbance compensation signal and the feedback control signal.

10. A system as claimed in claim 9, further comprising a dynamic characteristic compensation circuit for receiving the disturbance compensation signal and determining a dynamic compensation signal, said dynamic compensation signal being added to the manipulated signal, in order to compensate for the dynamic characteristics.

11. A system as claimed in claim 4, in which the gain adaptive means comprises a sample value control unit, a signal correction system for correcting the disturbance compensation signal and the manipulated signal which is output to the process so that the disturbance compensation signal and the manipulated signal are equal to each other, and a correction influence compensation system for compensating the disturbance compensation signal which is corrected by the signal correction system so as to suppress adverse effect due to correction, both of these systems executing the automatic correction and compensation operation, based on the correction signal from the sample value control unit, so as to minimize the degree of contribution of the feedback control to the feedback/feedforward control.

12. A system as claimed in claim 11, in which the signal correction system comprises a first multiplier for multiplying the correction signal from the sample control unit by the disturbance compensation signal from the feedforward control model, and the correction influence compensation system comprises a second multiplier for multiplying the disturbance compensation signal from the feedforward control model by the correction signal from the sample value control unit and a compensator for subtracting the influence compensation signal supplied from the second multiplier from the corrected disturbance compensation signal supplied from the first multiplier.

13. A method of process control comprising in combination a feedback control in which a manipulated variable is determined in accordance with a deviation of a controlled variable with reference to a target value and a feed-forward control in which a disturbance is detected and a disturbance compensation is determined and used in determining the manipulated variable to counteract the effect of the disturbance, said method comprising the step of:
    adjusting, when the process is in a steady state, said disturbance compensation in such a manner that the difference between the disturbance compensation and the manipulated variable is reduced.

14. A method as claimed in claim 13, in which said step of adjusting comprises:
    determining a coefficient in accordance with the disturbance compensation and the manipulated variable, and
    multiplying the detected disturbance by said coefficient to produce an adjusted disturbance compensation.

15. A method as claimed in claim 13, in which said step of adjusting comprises:
    determining the difference between the compensation component and the manipulated variable, and
    integrating said difference to produce said coefficient.

16. A method as claimed in claim 13, in which said deviation is applied to a velocity-type controller, and a static compensation component and a dynamic compensation component of said disturbance compensation are determined in accordance with the detected disturbance, and said method further comprises the steps of:
    determining, in accordance with the detected disturbance, a static compensation component and a dynamic compensation component of the disturbance compensation,
    converting the static compensation component to a velocity type signal,
    adding the converted static compensation component to the output of the controller to obtain a first sum,
    converting the first sum to a position type signal,
    adding the dynamic compensation component to the converted first sum to obtain the manipulated variable.

17. A process control system comprising in combination a feed-back control system determining a manipulated variable in accordance with a deviation of the controlled variable with reference to a target value, and a feed-forward control system having means for detecting a disturbance and determining, in accordance with the detected disturbance, a disturbance compensation to be used in determining the manipulated variable to counteract the effect of the disturbance, said process control system comprising:
    disturbance compensation determining means determiniing, in accordance with the detected disturbance, the disturbance compensation, and
    judging means for judging whether or not the control is in a steady state,
    said disturbance compensation determining means modifying a factor for determining the disturbance compensation to reduce the difference between the disturbance compensation and the manipulated variable.

18. A system as claimed in claim 17, in which said disturbance compensation determining means comprises a multiplier and means for determining a coefficient in accordance with the disturbance compensation and the manipulated variable, said multiplier multiplying the detected disturbance by said coefficient to produce an adjusted disturbance compensation.

19. A system as claimed in claim 18, in which said means for determining a coefficient comprises:
    subtracting means for determining the difference between the compensation component and the manipulated variable, and
    integrating means for integrating said difference to produce said coefficient.

20. A process control system as claimed in claim 17, in which said feed-back control system comprises a velocity type controller, said disturbance compensation means determines, in accordance with the detected disturbance, a static compensation component and a dynamic compensation component of the disturbance compensation, and said process control system further comprises:
    position type to velocity type converting means for converting the static compensation component into a velocity type signal,
    first adding means for adding the output of the position type to velocity type converting means and the output of the controller to obtain a first sum,
    velocity type to position type converting means for converting the first sum into a position type signal, and
    second adding means for adding the dynamic compensation component and the output of the velocity type to position type converter to obtain the manipulated variable.

* * * * *